(12) United States Patent
Pokhrel et al.

(10) Patent No.: US 11,995,272 B2
(45) Date of Patent: May 28, 2024

(54) SYSTEMS AND METHODS OF FALSE GESTURE MITIGATION IN CAPACITIVE TOUCH SENSORS USING NEGATIVE TEMPERATURE COEFFICIENT DIELECTRIC LAYERS

(71) Applicant: Apple Inc., Cupertino, CA (US)

(72) Inventors: Santosh Pokhrel, San Francisco, CA (US); Nandita Venugopal, San Francisco, CA (US); Supratik Datta, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/326,743

(22) Filed: May 31, 2023

(65) Prior Publication Data

US 2024/0004500 A1    Jan. 4, 2024

Related U.S. Application Data

(60) Provisional application No. 63/367,476, filed on Jun. 30, 2022.

(51) Int. Cl.
*G06F 3/00* (2006.01)
*G06F 3/041* (2006.01)
*G06F 3/044* (2006.01)

(52) U.S. Cl.
CPC ...... *G06F 3/04186* (2019.05); *G06F 3/04164* (2019.05); *G06F 3/0443* (2019.05); *G06F 3/0446* (2019.05); *G06F 2203/04107* (2013.01)

(58) Field of Classification Search
CPC ....... G06F 2203/04107; G06F 3/04164; G06F 3/04186; G06F 3/0443; G06F 3/0446
See application file for complete search history.

(56) References Cited

U.S. PATENT DOCUMENTS

| | | |
|---|---|---|
| 9,542,042 B2 | 1/2017 | Ksondzyk et al. |
| 10,025,410 B2 | 7/2018 | Kim et al. |
| 10,504,096 B1 | 12/2019 | Hafemann et al. |
| 10,572,081 B2 | 2/2020 | Vandermeijden |
| 2008/0007539 A1* | 1/2008 | Hotelling ............ G06F 3/0443 345/173 |
| 2019/0171496 A1* | 6/2019 | Kramer ................. G06F 9/52 |

* cited by examiner

*Primary Examiner* — Insa Sadio
(74) *Attorney, Agent, or Firm* — Kubota & Basol LLP

(57) ABSTRACT

Touch sensor panels/screens can include negative temperature coefficient materials in the stack-up and routing traces with expanded areas to reduce thermal drift and minimize the detection of false touches. In some examples, the touch sensor panels/screens can include a plurality of touch electrodes in a first layer. In some examples, the sensor panels/screens can include one or more dielectric materials in a second layer, the one or more dielectric materials including a negative temperature coefficient material. In some examples, the touch sensor panels/screens can include a plurality of routing traces in a third layer, the plurality of routing traces routing the plurality of touch electrodes to a touch controller chip.

20 Claims, 14 Drawing Sheets

SYSTEMS AND METHODS OF FALSE GESTURE MITIGATION IN CAPACITIVE TOUCH SENSORS USING NEGATIVE TEMPERATURE COEFFICIENT DIELECTRIC LAYERS

CROSS-REFERENCE TO RELATED APPLICATIONS

This application claims the benefit of U.S. Provisional Application No. 63/367,476, filed Jun. 30, 2022, the contents of which are incorporated herein by reference in its entirety for all purposes.

FIELD OF THE DISCLOSURE

This relates generally to touch sensor panels/screens, and more particularly to touch sensor panels/screens including negative temperature coefficient materials in the stack-up and routing traces with expanded areas.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel and may accept "multi-touch gestures" as inputs.

Capacitive touch sensor panels can be formed by a matrix of transparent, semi-transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates generally to touch sensor panels/screens, and more particularly to touch sensor panels/screens including negative temperature coefficient materials in the stack-up and routing traces with expanded areas. In some examples, thermal drift in a touch sensor panel (e.g., due to heat generated by a touch chip or a finger of a user) can cause false touches to be detected at various regions of the touch sensor panel. The false touches detected at a first region of a touch sensor can result in a diminished user experience during the operation of the touch sensor panel due to the unintended triggering of device functions even in the absence of a touch at the first region of the touch sensor panel. In some examples, to mitigate or to reduce false touches, the touch sensor panel stack-up can be adjusted to replace certain dielectric layers such as positive temperature coefficient materials with negative temperature coefficient materials. In some examples, instead of replacing the positive temperature coefficient materials, negative temperature coefficient materials can be added to the dielectric layers of the touch sensor panel to counterbalance drift due to positive temperature coefficient materials. In some examples, dimensions of specific regions of the touch sensor panel can be adjusted to reduce the overall thermal drift by tuning the thickness and area (length and or width) of the negative temperature coefficient material. In some examples, in regions where touch electrodes on the touch sensor panel and their routing traces (e.g., for electrically connecting the electrodes to a touch controller chip) are susceptible to thermal drift, the routing traces can be tuned by increasing their surface area (e.g., increasing width) at the specific regions where false touches are more likely to occur. In this way, the increase in the surface area of the routing traces and the negative temperature coefficient material can work in conjunction to reduce the overall thermal drift in the touch sensor panel. In some examples, additionally or alternatively, the routing trace can extend beyond the boundary of its corresponding touching electrode and into the boundary of adjacent touch electrodes to further reduce the overall thermal drift.

DETAILED DESCRIPTION

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

This relates generally to touch sensor panels/screens, and more particularly to touch sensor panels/screens including negative temperature coefficient materials in the stack-up and routing traces with expanded areas. In some examples, thermal drift in a touch sensor panel (e.g., due to heat generated by a touch chip or a finger of a user) can cause false touches to be detected at various regions of the touch sensor panel. The false touches detected at a first region of a touch sensor can result in a diminished user experience during the operation of the touch sensor panel due to the unintended triggering of device functions even in the absence of a touch at the first region of the touch sensor panel. In some examples, to mitigate or to reduce false touches, the touch sensor panel stack-up can be adjusted to replace certain dielectric layers such as positive temperature coefficient materials with negative temperature coefficient materials. In some examples, instead of replacing the positive temperature coefficient materials, negative temperature coefficient materials can be added to the dielectric layers of the touch sensor panel to counterbalance drift due to positive temperature coefficient materials. In some examples, dimensions of specific regions of the touch sensor panel can be adjusted to reduce the overall thermal drift by tuning the thickness and area (length and or width) of the negative temperature coefficient material. In some examples, in regions where touch electrodes on the touch sensor panel and their routing traces (e.g., for electrically connecting the electrodes to a touch controller chip) are susceptible to thermal drift, the routing traces can be tuned by increasing their surface area (e.g., increasing width) at the specific regions where false touches are more likely to occur. In this way, the increase in the surface area of the routing traces and the negative temperature coefficient material can work in conjunction to reduce the overall thermal drift in the touch sensor panel. In some examples, additionally, or alternatively, the routing trace can extend beyond the boundary of its corresponding touching electrode and into the boundary of adjacent touch electrodes to further reduce the overall thermal drift.

Figure 1A:
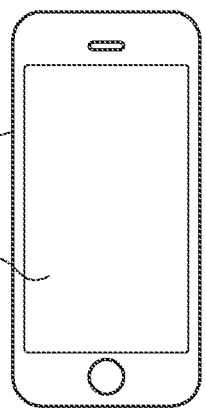
FIGS. 1A-1H illustrate touch sensing devices or systems that can include a touch screen or touch sensor panel according to examples of the disclosure.
Figure 1B:
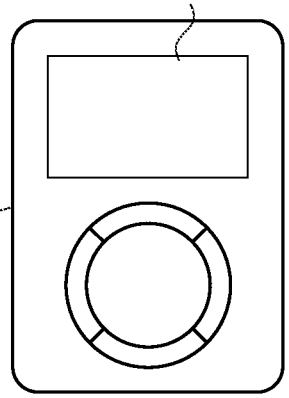
Figure 1C:
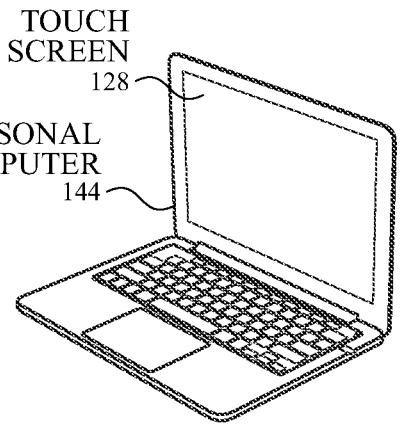
Figure 1D:
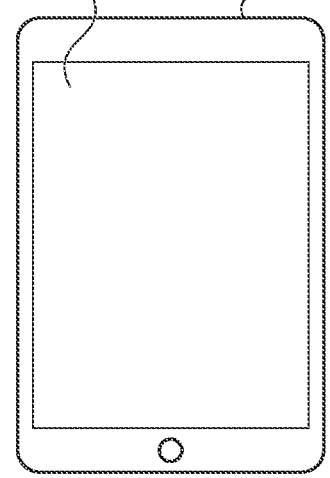
Figure 1E:
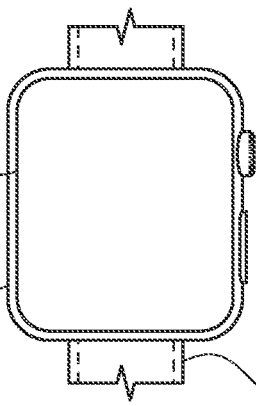
Figure 1F:
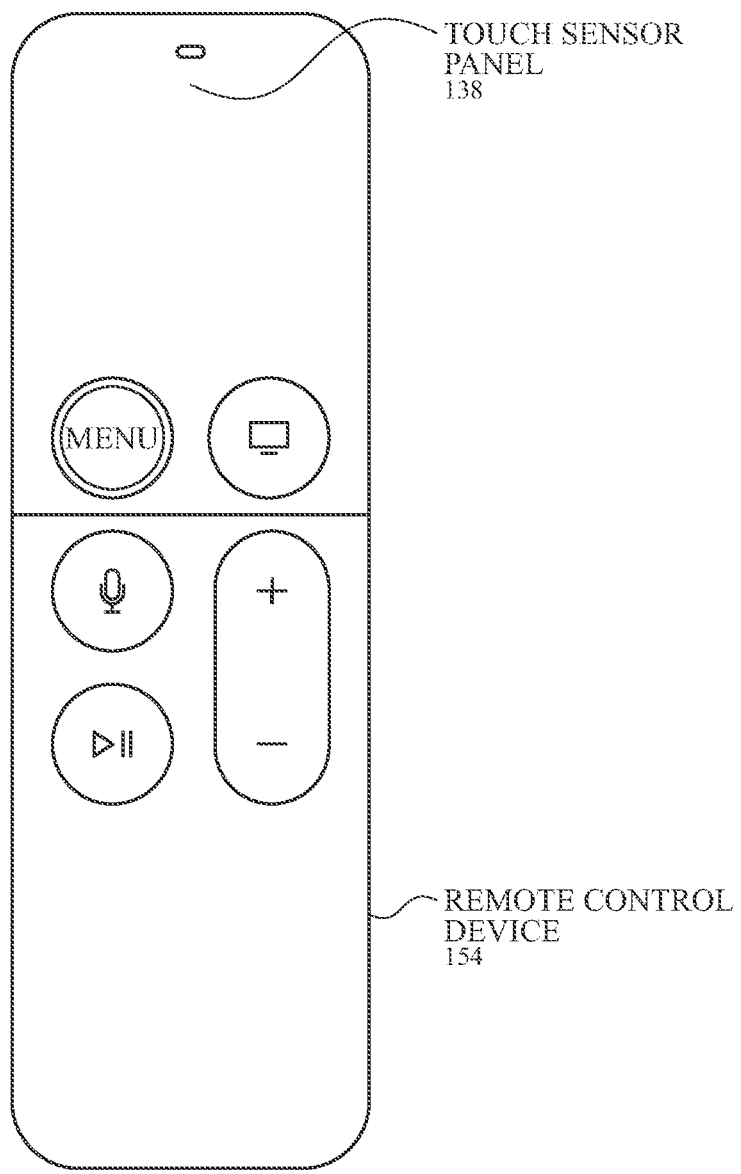
Figure 1G:
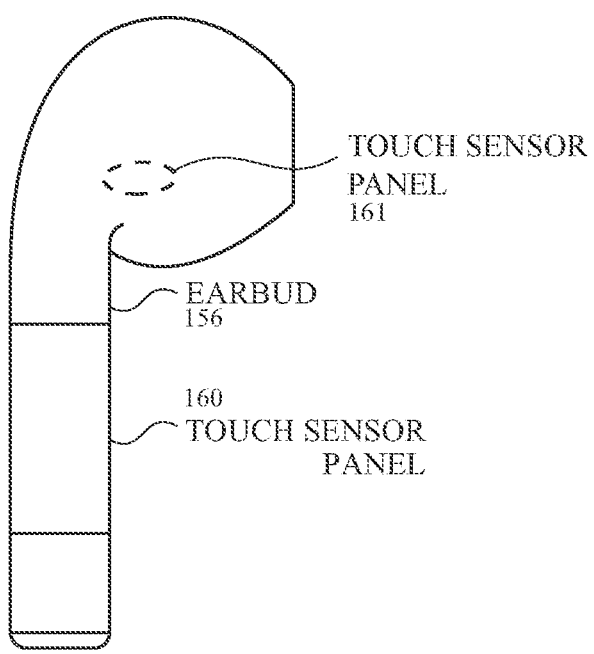
Figure 1H:
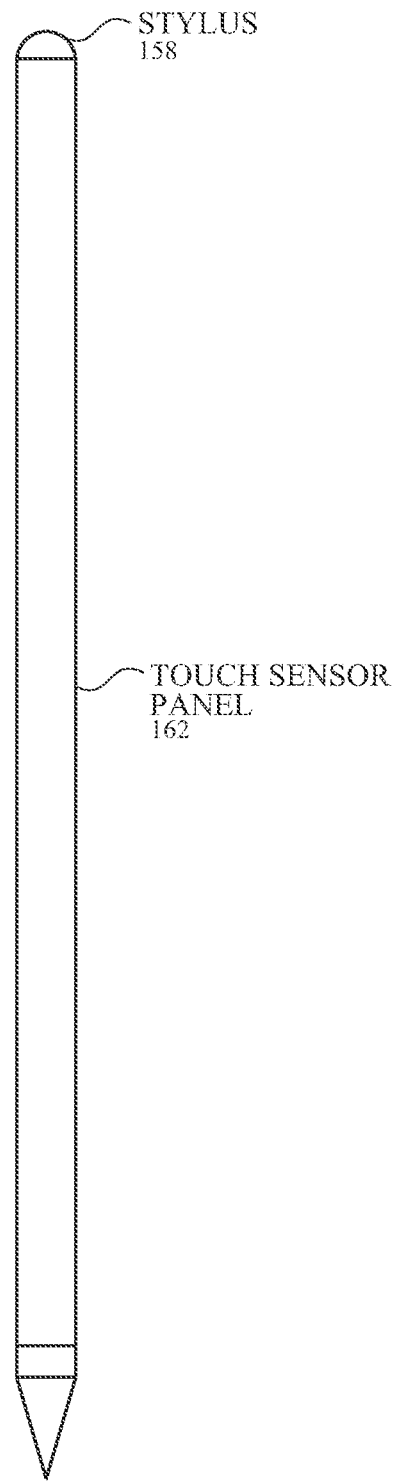
Figure 10:
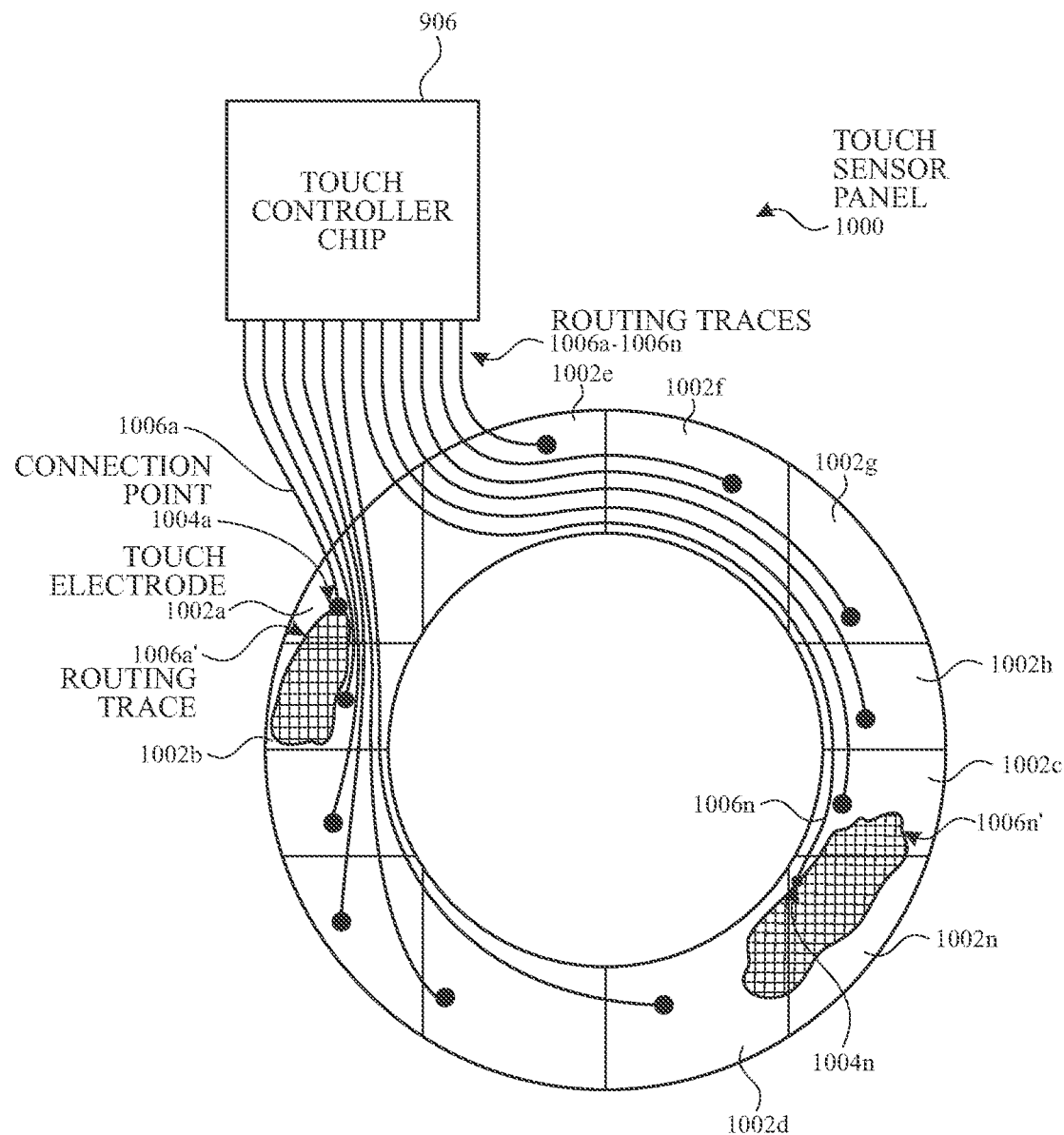
FIG. 10 illustrates another example touch sensor panel system including a plurality of routing traces routing a plurality of touch electrodes to a touch controller chip according to examples of the disclosure.

FIGS. 1A-1H illustrate touch sensing devices or systems that can include a touch screen or touch sensor panel according to examples of the disclosure. The touch screen or touch sensor panel can include dielectric layers which include negative temperature coefficient materials and/or routing traces with expanded surface areas to help minimize the overall thermal drift on the touch sensor panel. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. FIG. 1F illustrates an example remote control device 154 that can include a touch sensor panel 138 according to examples of the disclosure. The touch sensor panel 138 can have different geometries or sizes. In some examples, the touch sensor panel 138 is a rectangular touch sensor panel. In some examples, the touch sensor panel 138 is a circular touch sensor panel. For example, FIG. 10 illustrates a circular touch sensor panel 1000 shown in FIG. 10 that can be implemented as touch sensor panel 138 for remote control device 154. As shown in FIG. 10, the circular touch sensor panel can be implemented the surface area as a ring between two concentric circles. FIG. 1G illustrates an example earbud 156 (or other audio device) that can include one or more a touch sensor panels 160, 161 according to examples of the disclosure. For example, touch sensor panel 160 is optionally used to for touch input from a user's finger (e.g., inputs to adjust volume or media playback) and touch sensor panel 161 is optionally used to detect that earbud 156 is touching or proximate to the user (e.g., for in-ear detection). FIG. 1H illustrates an example stylus 158 that can include a touch sensor panel 162 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1H can further include touch sensor panels on surfaces not shown in the figures. Touch screens or touch sensor panels 124, 126, 128, 130, 132, 134, 138, 160, 161 and 162 can be single-touch or multi-touch touch screens or touch sensor panels that can detect one object or multiple objects.

In some examples, touch screens or touch sensor panels 124, 126, 128, 130, 132, 134, 138, 160, 161 and 162 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens or touch sensor panels 124, 126, 128, 130 and 132, 134, 138, 160, 161 and 162 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens or touch sensor panels 124, 126, 128, 130 and 132, 134, 138, 160, 161 and 162 can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
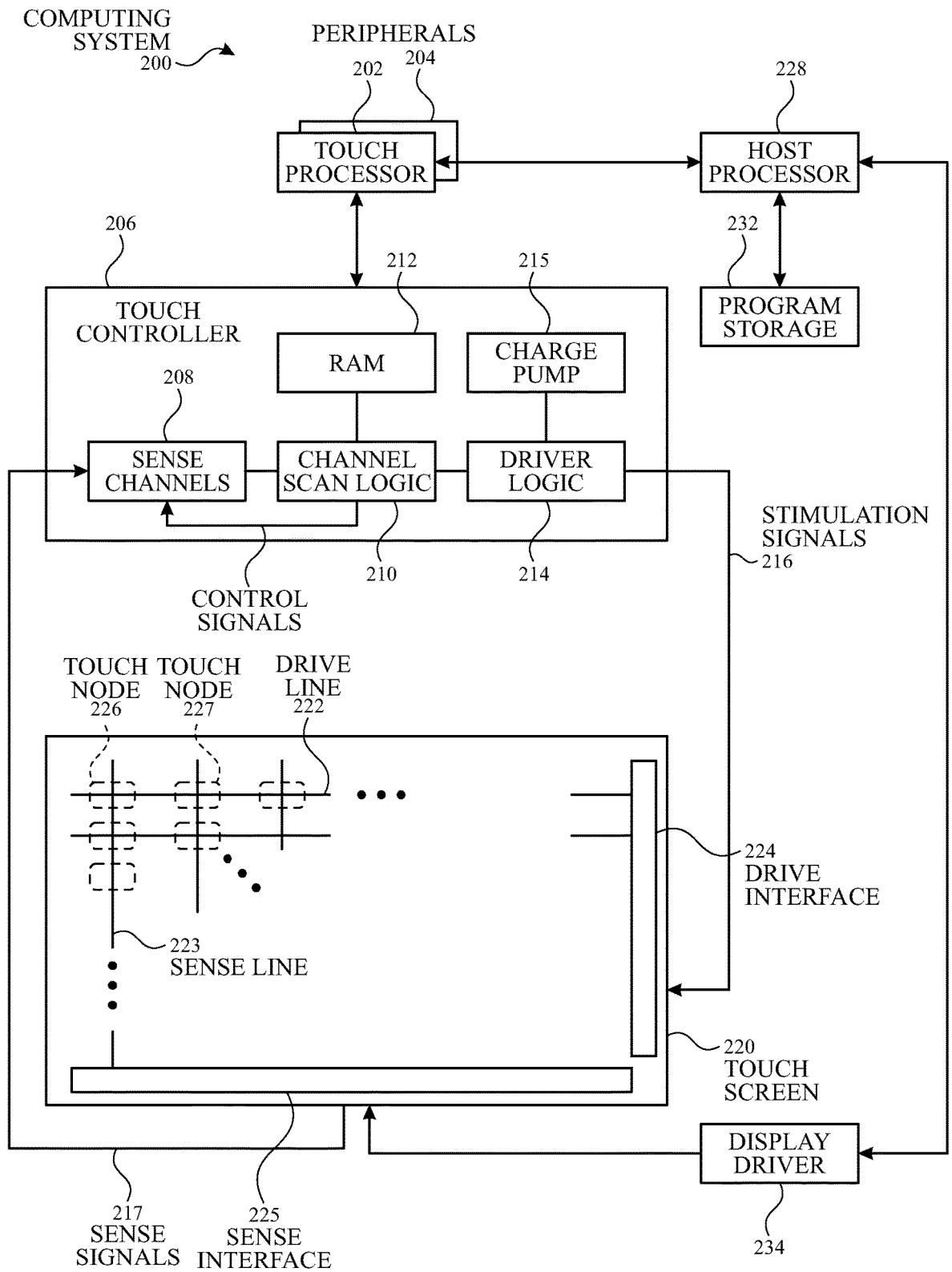
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206 (also referred to herein as a touch controller chip), and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
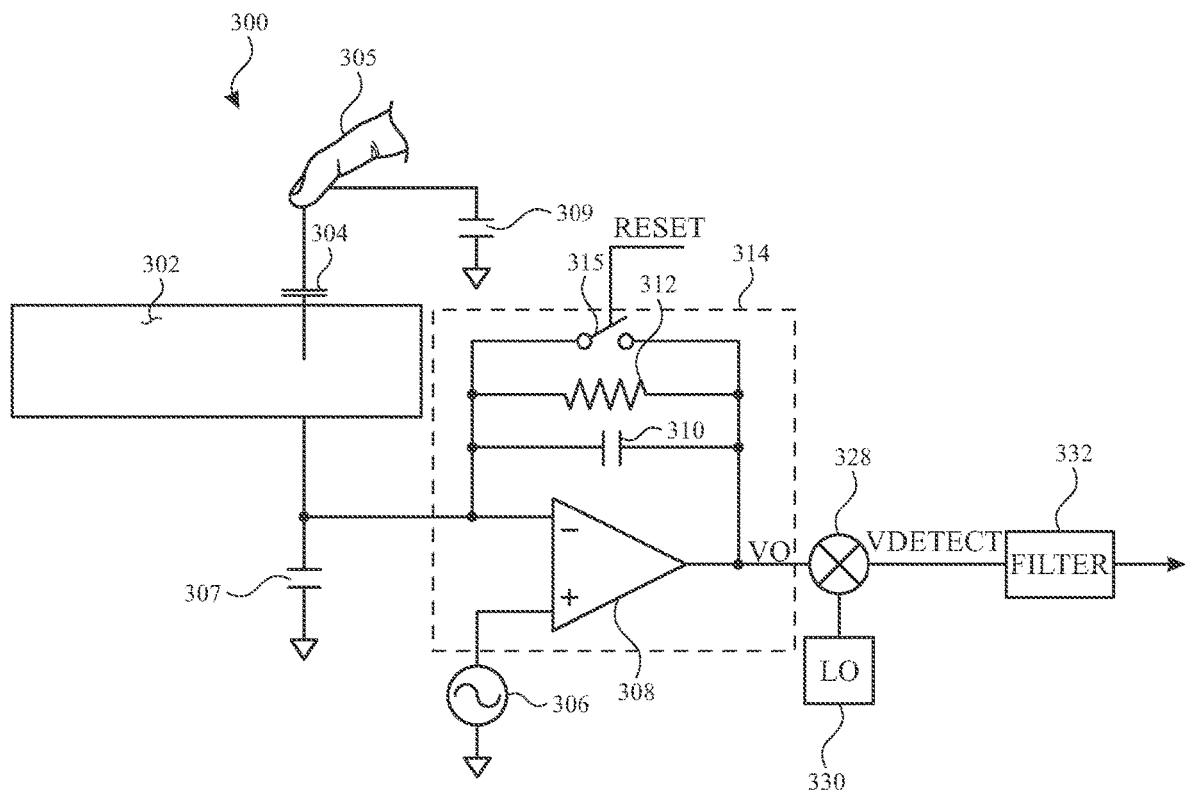
FIG. 3A illustrates a touch sensor circuit corresponding to a self-capacitance measurement of a touch node electrode and sensing circuit according to examples of the disclosure.

FIG. 3A illustrates an example touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
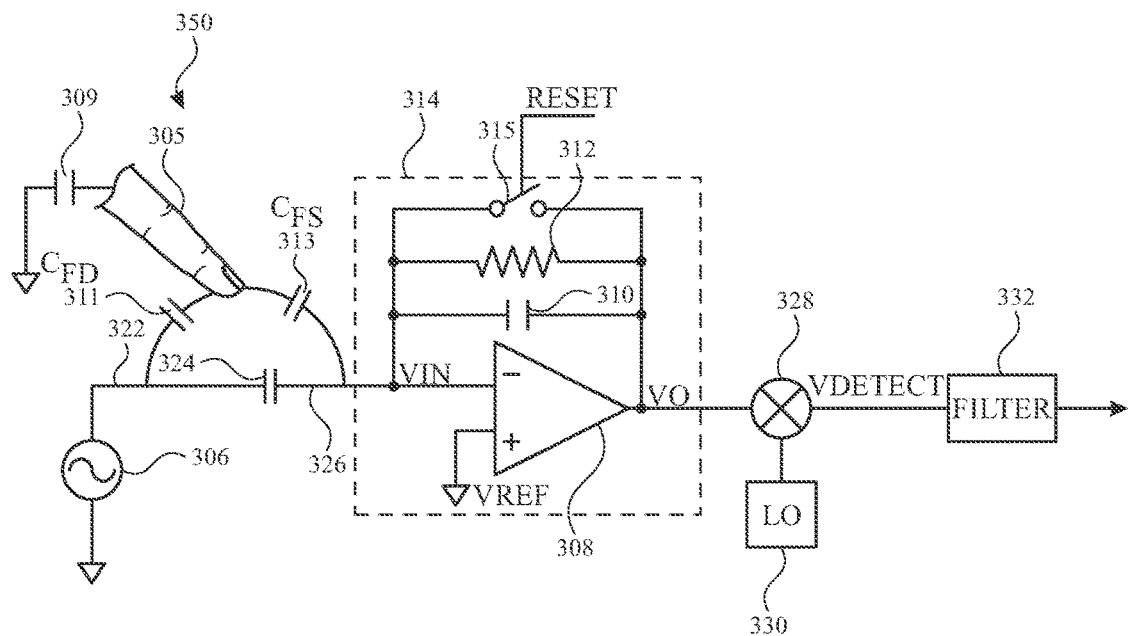
FIG. 3B illustrates a touch sensor circuit corresponding to a mutual-capacitance drive line and sense line and sensing circuit according to examples of the disclosure.

FIG. 3B illustrates an example touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger 305 or object approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
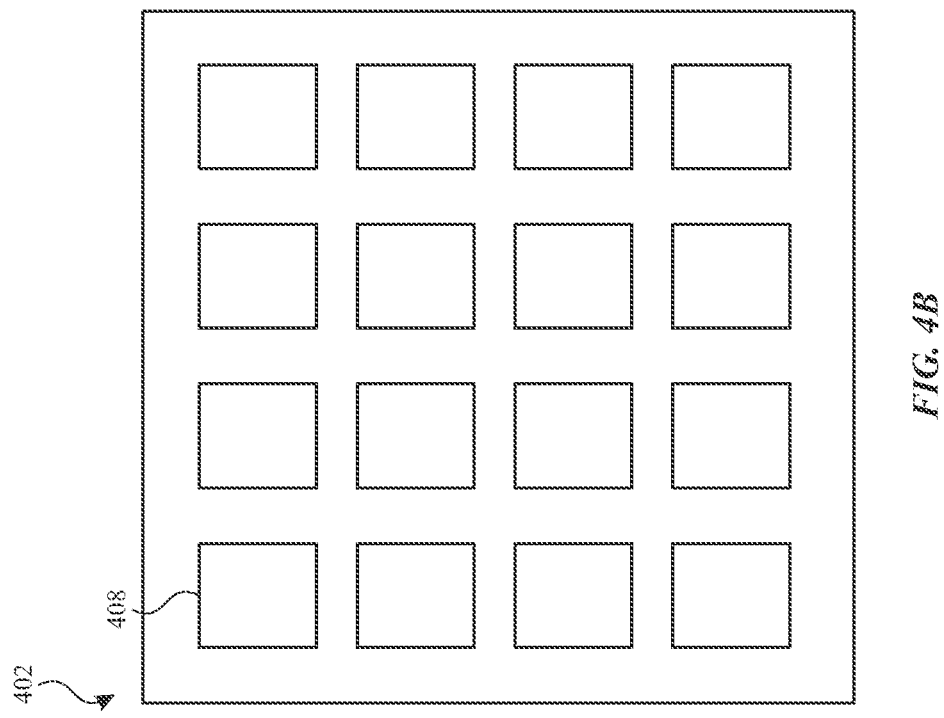
FIG. 4B illustrates a touch screen or touch sensor panel with touch node electrodes arranged in a pixelated touch node electrode configuration according to examples of the disclosure.
Figure 4A:
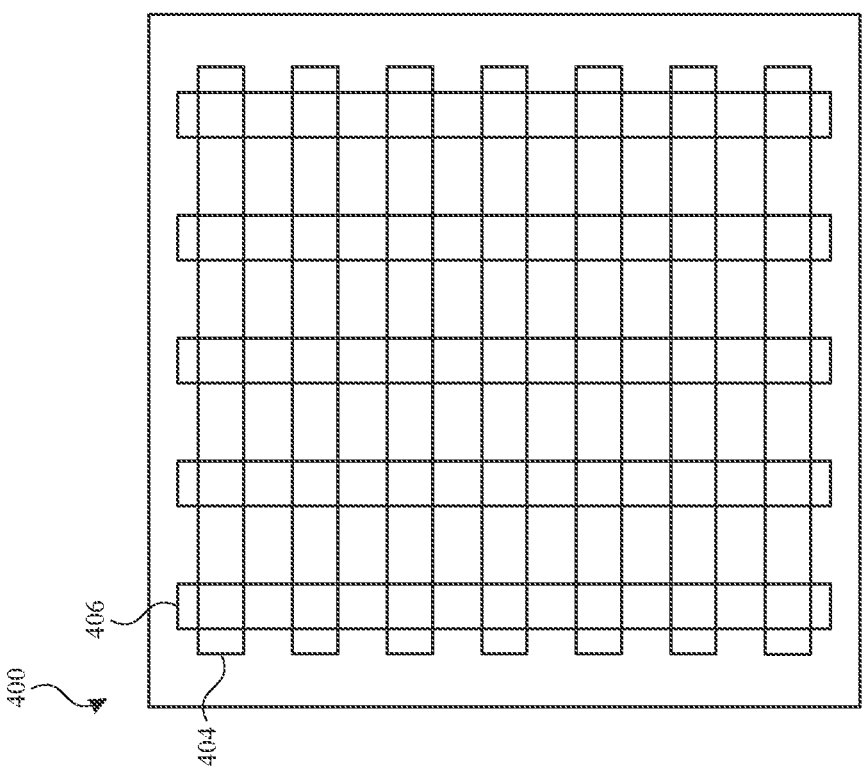
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

Figure 5A:
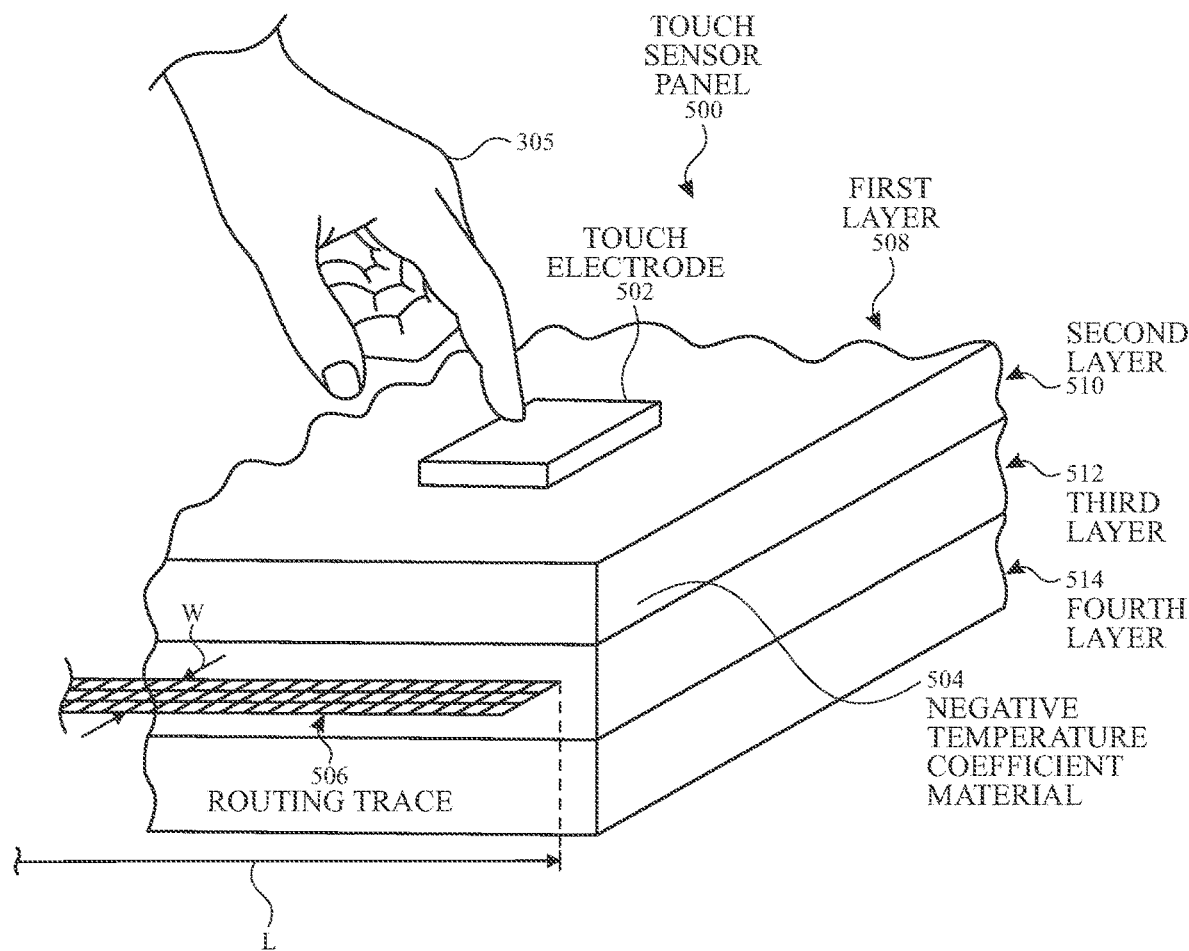
FIG. 5A illustrates an example partial perspective view of a touch sensor panel illustrating a first layer, a second layer, and a third layer of the touch sensor panel according to examples of the disclosure.

FIG. 5A is an example partial perspective view of a touch sensor panel 500 illustrating a first layer 508, a second layer 510, and a third layer 512 of the touch sensor panel 500 according to examples of the disclosure. As shown, in some examples, a touch electrode 502 (e.g., corresponding to one of touch node electrodes 408) is located in the first layer 508 of the touch sensor panel 500. The touch sensor panel 500 can further include one or more dielectric layers or a composite of dielectric layers located in the second layer 510. In the illustrated example, a negative temperature coefficient material 504 is implemented in the stack-up, which can help minimize the thermal drift during the operation of the touch sensor panel 500 as described herein. In some examples, the touch sensor panel 500 includes a routing trace 506 that is located in the third layer 512 and is coupled to a connection point of the touch electrode 502 and configured to route the touch electrode 502 to a touch controller chip (not shown). False touches that might otherwise occur when a finger 305 or other object is in proximity to the touch electrode 502 can be eliminated or minimized by implementing the negative temperature coefficient material 504 within the dielectric layer of the touch sensor panel 500 to reduce thermal drift. Generally, the dielectric constant of negative temperature coefficient materials decreases with increasing temperature. Negative temperature coefficient materials include, but are not limited to, polymer (e.g., polyimide (PI)), carbon, silicon, and germanium. In the illustrated example, a ground shield is optionally implemented in a fourth layer 514.

In some examples, specific regions of the touch sensor panel 500 may be more susceptible to thermal drift than other areas of the touch sensor panel 500. In particular, relatively smaller area touch electrodes that receive relatively small touch signal compared with relatively larger area touch electrodes can be more susceptible to thermal drift (e.g., due to a larger calibration gain or higher ratio of baseline signal to touch signal). Accordingly, in some examples, the size of the routing trace 506 can be tuned at selected regions of the touch sensor panel so that the routing trace has a larger surface area at the selected regions compared to the surface area of other routing traces at other regions of the touch sensor panel. For example, as shown in FIG. 5A, the routing trace 506 may have a length (L) and a width (W). The length and width of the routing trace 506 can be adjusted to increase the surface area of the routing trace 506 at the region that is proximate to touch electrode 502. Increasing the surface area of the routing trace 506 by adjusting its length and/or width within the region that is proximate to the touch electrode 502 can increase the negative drift caused by the negative temperature coefficient material 504 to have a greater influence on the reduction of thermal drift on the touch electrode 502 (e.g., to better counteract the drift from positive temperature coefficient materials and/or the touch controller chip). In some examples, the routing trace 506 can extend beyond the boundary or region of the touch electrode 502 (e.g., entering a first boundary of the touch electrode and exiting a second boundary of the touch electrode, such as the opposite boundary) and into the region of one or more other touch electrodes that are adjacent to the touch electrode 502. Extending the routing trace 506 can further increase the area of the routing trace and further reduce the overall thermal drift.

Figure 5B:
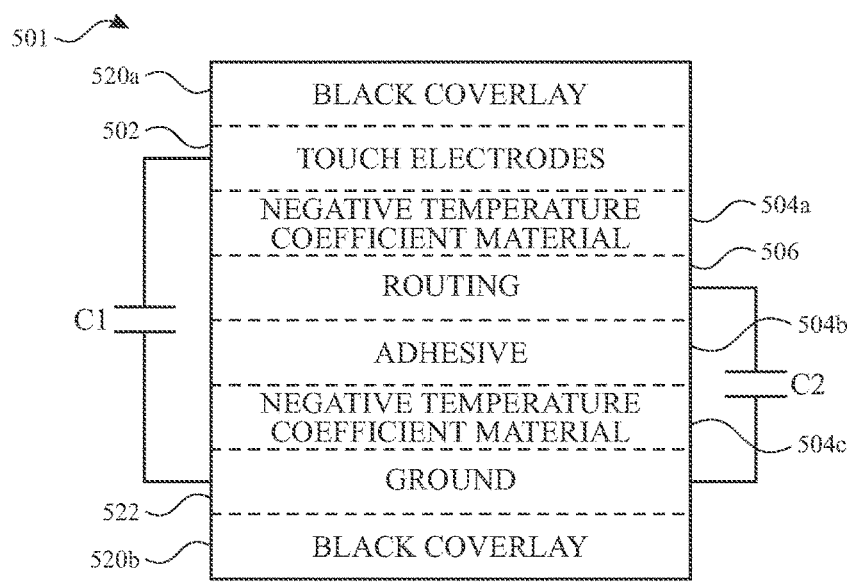
FIG. 5B illustrates a cross-sectional view of an example touch sensor panel stack-up including negative temperature coefficient materials according to examples of the disclosure.

FIG. 5B illustrates a cross-sectional view of an example touch sensor panel stack-up including negative temperature coefficient materials according to examples of the disclosure. The touch sensor panel stack-up 501 can include an upper dielectric layer 520a (e.g., Black Coverlay) and a lower dielectric layer 520b (e.g., Black Coverlay) on an upper layer (e.g., topmost layer) and a bottom layer (e.g., bottommost) of the stack-up. As shown, a touch electrode 502 (e.g., corresponding to one of touch node electrodes 408 and corresponding to the first layer 508 in FIG. is located between the upper dielectric layer 520a and a dielectric layer 504a (e.g., PI-Polyimide and corresponding to the second layer 510 in FIG. 5A). The upper layer may include a positive temperature coefficient material and the dielectric layer 504a may include a negative temperature coefficient. The touch sensor panel stack-up 501 can also include one or more dielectric layers between the routing trace 506 (e.g., corresponding to the third layer 512 in FIG. 5A). For example, the touch sensor panel stack-up 501 can include a dielectric layer 504a and dielectric layer 504c (optionally including a dielectric adhesive layer 504b) that separates the routing trace 506 (e.g., Cu) from ground layer 522 (e.g., areas filled with conductive material and corresponding to fourth layer 514). In particular, dielectric layer 504a and dielectric layer 504c are negative temperature coefficient materials (e.g., polyimide materials), and adhesive layer 504b is an adhesive that optionally also has a negative temperature coefficient. By including one or more negative temperature coefficient materials (e.g., adhesive and/or PI) in the touch sensor panel stack-up 501, a reduction in thermal drift in the touch sensor panel can be achieved. In some examples, the touch sensor panel stack-up 501 of FIG. 5B can be tuned to reduce thermal drift and optionally achieve a condition for substantially zero thermal drift as described below with reference to FIGS. 6B-6C and FIGS. 7A-7B.

Figure 6A:
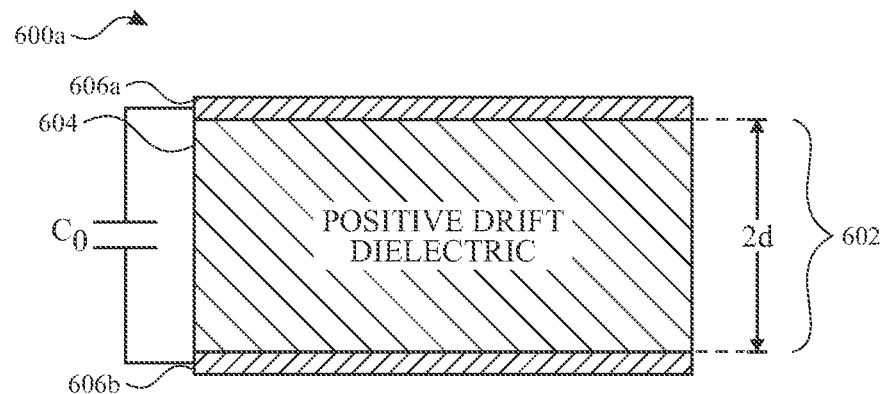
FIGS. 6A-6C illustrate cross-sectional views of various examples of dielectric layers of a touch sensor panel which includes a negative drift dielectric material according to examples of the disclosure.
Figure 6B:
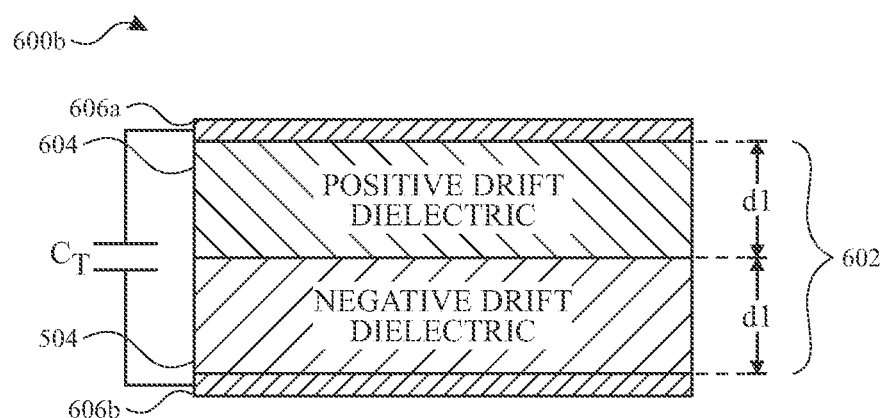
Figure 6C:
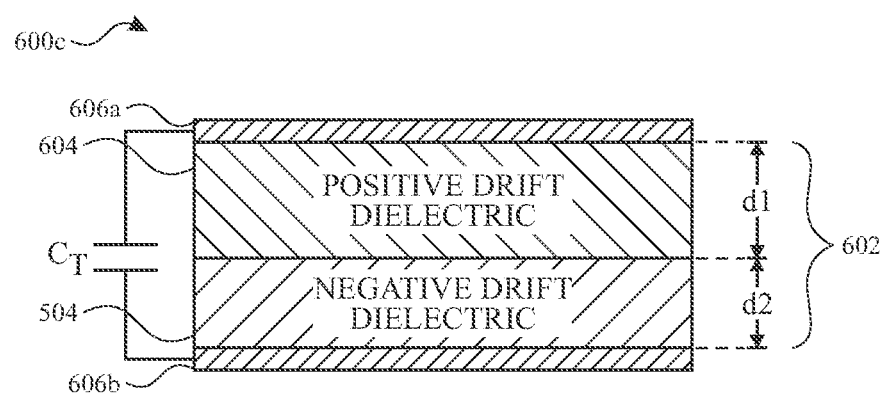

FIG. 6A-6C illustrate cross-sectional views of various examples of dielectric layers 602 of a touch sensor panel which includes a negative drift dielectric material according to examples of the disclosure. The negative drift dielectric material can counteract positive drift due to the touch controller chip or positive drift dielectric materials to help reduce net thermal drift and/or to reach a condition of substantially zero thermal drift (e.g., less than a threshold thermal drift rate such that the baseline adaptation rate in the touch sensing algorithm can capture and remove thermal drift as part of the baselining operation). As shown in FIG. 6A, the dielectric layer 602 of a touch sensor panel 600a includes a positive temperature coefficient material 604 having a thickness 2d that is located between a first electrode 606a and a second electrode 606b. In some examples, the first electrode 606a corresponds to the touch electrode 502 in the first layer 508 and the second electrode 606b corresponds to the ground in the fourth layer 514 of the touch sensor panel 500. In some examples, when the dielectric layer 602 of a touch sensor panel 600 incudes only a positive temperature coefficient material 604 without a negative temperature coefficient material 504, thermal drift can cause false touches to be detected. The thermal drift may result in false touches occurring at various regions of the touch sensor panel when the thermal drift exceeds a threshold. In some examples, the false touches may occur in the absence of any actual finger or object touching the touch sensor panel 600a, such as when a finger or other object is in close proximity to the touch sensor panel 600a, or even after a finger is removed from the touch sensor panel 600a. Accordingly, to mitigate the false touches, the stack-up of touch sensor panel 600a can be adjusted to replace a positive temperature coefficient material 604 with a negative temperature coefficient material 504, or to supplement the dielectric layers 602 with a negative temperature coefficient material.

For example, referring to FIG. 6B, the dielectric layer 602 includes a positive temperature coefficient material 604 and a negative temperature coefficient material 504 located between a first electrode 606a and a second electrode 606b. In the illustrated example, the positive temperature coefficient material 604 and the negative temperature coefficient material 504 have the same thickness where their respective thicknesses are defined by thickness d1. In some examples, for the configuration shown in FIG. 6B to achieve a condition for substantially zero thermal drift, a negative temperature coefficient material 504 can be selected such that its temperature coefficient of dielectric constant (e.g., $\alpha 2$) meets the following condition:

$$\alpha 2 = -\alpha 1 \left(\frac{\epsilon 20}{\epsilon 10}\right)^2,$$

where α1 is the temperature coefficient of dielectric constant for the positive temperature coefficient material 604, ϵ20 is the electric permittivity of the negative temperature coefficient material 504, and ϵ10 is the electric permittivity of the positive temperature coefficient material 604. Accordingly, selecting a negative temperature coefficient material 504 having the noted material characteristics and incorporating it into the touch sensor panel 600b stack can help reduce thermal drift.

In some examples, the thicknesses of the positive temperature coefficient material 604 and the negative temperature coefficient material 504 can be tuned to achieve a condition for substantially zero thermal drift. Referring to FIG. 6C, the dielectric layer 602 includes a positive temperature coefficient material 604 and a negative temperature coefficient material 504 located between a first electrode 606a and a second electrode 606b. As shown, the positive temperature coefficient material 604 has a thickness d1 and the negative temperature coefficient material 504 has a thickness d2. To achieve a condition for substantially zero thermal drift, the thickness d2 of the negative temperature coefficient material 504 can be tuned so that it meets the following condition:

$$d2 = -d1\left(\frac{\alpha 1}{\alpha 2}\right)\left(\frac{\epsilon 20}{\epsilon 10}\right)^2,$$

where α1 is the temperature coefficient of dielectric constant for the positive temperature coefficient material 604, α2 is the temperature coefficient of dielectric constant for the negative temperature coefficient material 504, ϵ20 is the electric permittivity of the negative temperature coefficient material 504, and ϵ10 is the electric permittivity of the positive temperature coefficient material 604. Accordingly, to reduce the thermal drift in the touch sensor panel, the thicknesses of the positive temperature coefficient material 604 and the negative temperature coefficient material 504 can be tuned to meet the noted condition.

As further illustrated in FIGS. 6A-6C, capacitance $C_0$ and capacitance $C_T$ represent the capacitances between its respective pairs of electrodes 606a-606b. In some examples, the capacitances between the pairs of electrodes can depend on factors such as the surface areas of the electrodes, the distance between the electrodes, and the dielectric materials between the electrodes. Accordingly, capacitance $C_0$ and capacitance $C_T$ can differ based on the configuration of the touch sensor panel such as the surface area of the electrodes 606a-606b and the dielectric material between the electrodes. For example, capacitance $C_0$ has a different capacitance than capacitance $C_T$ because the dielectric materials between the respective pairs of electrodes differ (e.g., touch sensor panel 600a includes a positive temperature coefficient material 604; and touch sensor panel 600b includes a positive temperature coefficient material 604 and a negative temperature coefficient material 504).

Figure 7A:
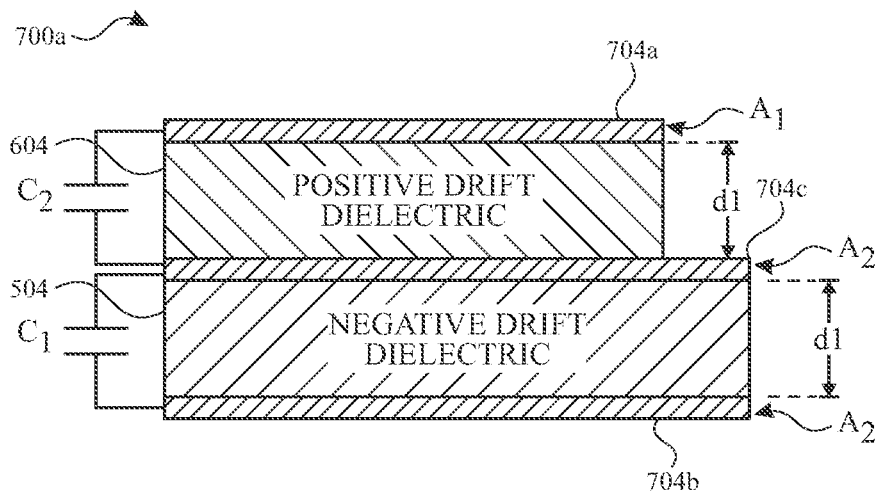
FIGS. 7A-7B illustrate cross-sectional views of various examples of dielectric layers and electrode conducting plates of a touch sensor panel according to examples of the disclosure.
Figure 7B:
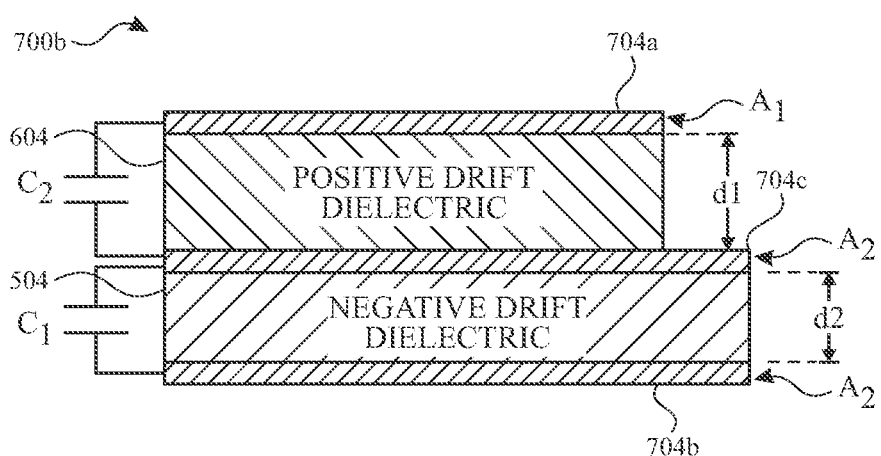

FIGS. 7A-7B illustrate cross-sectional views of various examples of dielectric layers and electrode conducting plates of a touch sensor panel 700a according to examples of the disclosure. The surface areas of the electrode conducting plates can be tuned to reduce thermal drift and optionally achieve a condition for substantially zero thermal drift. As shown in FIG. 7A, a portion of a touch sensor panel 700a includes a positive temperature coefficient material 604 and a negative temperature coefficient material 504 positioned between a first electrode 704a and a second electrode 704b and separated by a third electrode 704c. In some examples, the first electrode 704a can correspond to a touch electrode (e.g., touch electrode 502), the second electrode 704b can correspond to a ground, and the third electrode 704c can be a routing trace 506 that separates the positive temperature coefficient material 604 and the negative temperature coefficient material 504. In some examples, the positive temperature coefficient material 604 and the negative temperature coefficient material 504 have the same thickness where their respective thicknesses are defined by thickness d1. In some examples, the first electrode 704a has a surface area A1. In some examples, the second electrode 704b and the third electrode 704c have surface area A2. As illustrated in FIGS. 7A-7B, capacitance $C_2$ and capacitance $C_1$ represent the capacitances between its respective pairs of electrodes. For example, $C_2$ represents the capacitance between the first electrode 704a and the third electrode 704c, and $C_1$ represents the capacitance between the third electrode 704c and the second electrode 704b. In some examples, the capacitances between the pairs of electrodes depend on the surface areas of the electrodes, distance between the electrodes, and the dielectric materials between the electrodes. For example, the capacitance (C) is given by the following equation:

$$C = \kappa \epsilon_o \left(\frac{A}{d}\right),$$

where κ is the dielectric constant of the dielectric material, $\epsilon_0$ is the permittivity of free space, A is the average surface area of the respective electrodes, and d is the distance between the respective electrodes. Accordingly, capacitance $C_2$ and capacitance $C_1$ can differ based on the configuration of the electrodes and the dielectric material between the electrodes.

In some examples, for the configuration shown in FIG. 7A to obtain a condition for substantially zero thermal drift, the surface areas of the electrode conducting plates 704a-704c can be tuned to achieve a condition for substantially zero thermal drift by meeting the following condition:

$$A2 = -A1\left(\frac{\alpha 1}{\alpha 2}\right),$$

where A2 is the surface area of the second electrode 704b and the third electrode 704c, A1 is the surface area of the first electrode 704a, α1 is the temperature coefficient of dielectric constant for the positive temperature coefficient material 604, and α2 is the temperature coefficient of dielectric constant for the negative temperature coefficient material 504.

Referring to the configuration shown in FIG. 7B, a portion a touch sensor panel 700b is illustrated which includes a positive temperature coefficient material 604 and a negative temperature coefficient material 504 positioned between a first electrode 704a and a second electrode 704b and separated by a third electrode 704c. Unlike the configuration shown in FIG. 7A, the positive temperature coefficient material 604 and a negative temperature coefficient material 504 have different thicknesses which are defined by d1 and d2, respectively. The first electrode 704a has a surface area A1. The second electrode 704*b* and the third electrode 704*c* have surface area A2. For the configuration shown in FIG. 7B to obtain a condition for substantially zero thermal drift, the respective surface areas of the electrodes 704*a*-704*c* and the thicknesses of the dielectric materials can be tuned to meet the following condition:

$$A2 = -A1\left(\frac{\alpha 1}{\alpha 2}\right)\left(\frac{d2}{d1}\right),$$

where A2 is the surface area of the second electrode 704*b* and the third electrode 704*c*, A1 is the surface area of the first electrode 704*a*, $\alpha 1$ is the temperature coefficient of dielectric constant for the positive temperature coefficient material 604, and $\alpha 2$ is the temperature coefficient of dielectric constant for the negative temperature coefficient material 504, d1 is the thickness of the positive temperature coefficient material 604, and d2 is the thickness of the negative temperature coefficient material 504.

As described above with reference to FIGS. 6A-6C and 7A-7B, the various concepts are illustrative of the principles that can be used to tune the capacitance of portions of the touch sensor panel and in turn help reduce net thermal drift and/or to reach a condition of substantially zero thermal drift. For example, by tuning various parameters of the touch sensor panel stack-up, such as the respective surface areas of the electrodes, the thickness of the dielectric materials, the distance between the respective electrodes, and/or introducing a negative drift dielectric material with different coefficients, the net thermal drift can be reduced which in turn can mitigate false touches from occurring at various regions of the touch sensor panel.

Figure 8A:
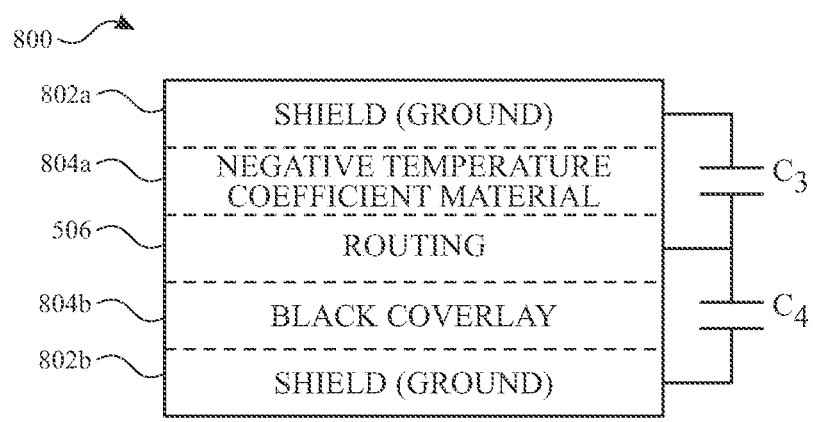
FIGS. 8A-8B illustrate cross-sectional views of an example configuration of a flex circuit stack-up which includes a positive temperature coefficient material, and an alternative configuration of a flex circuit stack-up, which include negative temperature coefficient materials, according to examples of the disclosure.
Figure 8B:
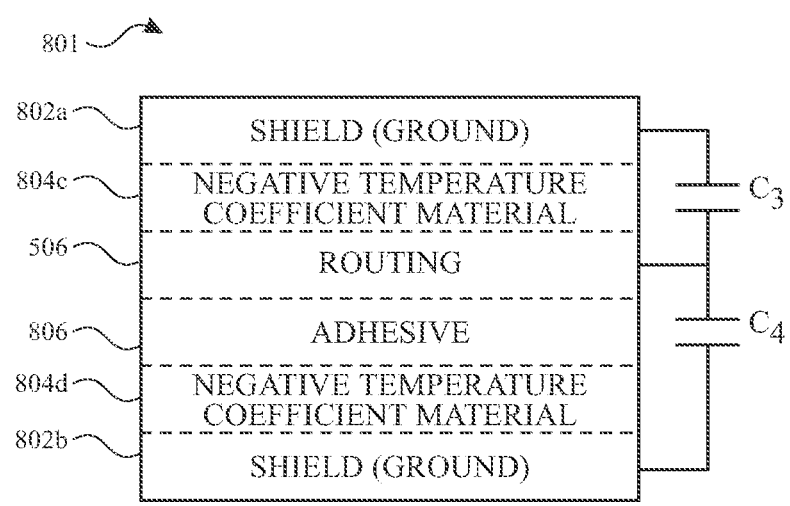

As described herein, in some examples, the connection between the touch electrodes of the touch sensor panel and the touch controller chip can be made using a flexible circuit (also referred to herein as a flex circuit). FIGS. 8A-8B illustrate cross-sectional views of an example configuration of a flex circuit 800 stack-up which includes a positive temperature coefficient material, and an alternative configuration of flex circuit 801 stack-up which includes negative temperature coefficient materials, according to examples of the disclosure. The flex circuits 800 or 801 can also include a routing trace 506 coupled (e.g., using an anisotropic conductive film bond) to the routing trace 506 of the touch sensor panel (e.g., routing trace 506 shown in FIG. 5A-5B. One or more additional layers of the flex circuits 800 or 801 stack-ups can be coupled to one or more additional layers of the touch sensor panel stack-up (e.g., the first dielectric layer 804*c* in FIG. 8B can be coupled to the first dielectric layer 504*a* in FIG. 5B, adhesive layer 806 in FIG. 8B can be coupled to the adhesive layer represented by adhesive layer 504*b* in FIG. 5B, the second dielectric layer 804*d* in FIG. 8B can be coupled to the second dielectric layer 504*c* in FIG. 5B).

As illustrated in FIGS. 8A-8B, the stack-up of flex circuits 800 and 801 can include ground layers 802*a*-802*b* (e.g., areas filled with conductive material) on a top layer and a bottom layer of the stack-up. In some examples, the ground layers 802*a*-802*b* can shield the routing traces. In some examples, the ground layers 802*a*-802*b* comprise silver. In some examples, the ground layers comprise other conductive materials (e.g., copper, etc.). The stack-up of flex circuit 800 can also include one or more dielectric layers between routing trace 506 and the ground layers. For example, the stack-up of flex circuit 800 illustrated in FIG. 8A can include a first dielectric layer 804*a* (e.g., PI) and second dielectric layer 804*b* (e.g., Black Coverlay) that separates the routing trace 506 (e.g., Cu) from the ground layers. The first dielectric layer may include a negative temperature coefficient and the second dielectric layer may include a positive temperature coefficient. In the illustrated example, Black Coverlay is a positive temperature coefficient material which is known to contribute to an increase in thermal drift which can cause false touches to be detected, whereas PI is a negative temperature coefficient material which can partially offset the thermal drift due to the positive temperature coefficient material (and/or due to the touch controller chip). Accordingly, to reduce or mitigate thermal drift measured by the touch sensor panel, the Black Coverlay can be replaced with one or more layers of a negative temperature coefficient material.

As illustrated in FIG. 8B, the alternate configuration flex circuit 801 stack-up includes a negative temperature coefficient material that replaces the positive temperature coefficient material (e.g., Black Coverlay) shown in the stack-up of flex circuit 800 configuration. As shown, the stack-up of flex circuit 801 includes multiple dielectric layers including negative temperature coefficient materials. In particular, first dielectric layer 804*c* and second dielectric layer 804*d* are polyimide materials. Adhesive layer 806 is an adhesive that optionally also has a negative temperature coefficient. By substituting the positive temperature coefficient material (e.g., Black Coverlay) in the stack-up with one or more negative temperature coefficient materials (e.g., adhesive and/or PI), a reduction in thermal drift measured by the touch sensor panel can be achieved.

In some examples, as described herein, the area of the routing trace 506 (e.g., Copper) in the touch sensor panel and or in the flex circuit 801 stack-up can be expanded to have a greater surface area. In some examples, the length and width of the routing trace can vary and be tuned at specific regions within the touch sensor panel so that its surface area is larger for the touch electrodes that are more susceptible to thermal drift. As discussed above with respect to FIGS. 7A-7B, the area of the electrodes (e.g., routing trace 506) can be increased to reduce thermal drift or achieve a condition for substantially zero thermal drift. In this way, the larger surface area of the routing trace 506 can enhance the contribution of the negative temperature coefficient materials in the stack-up, which in turn can result in a decrease in thermal drift and a decrease in false touches for the touch sensor panel.

Figure 9A:
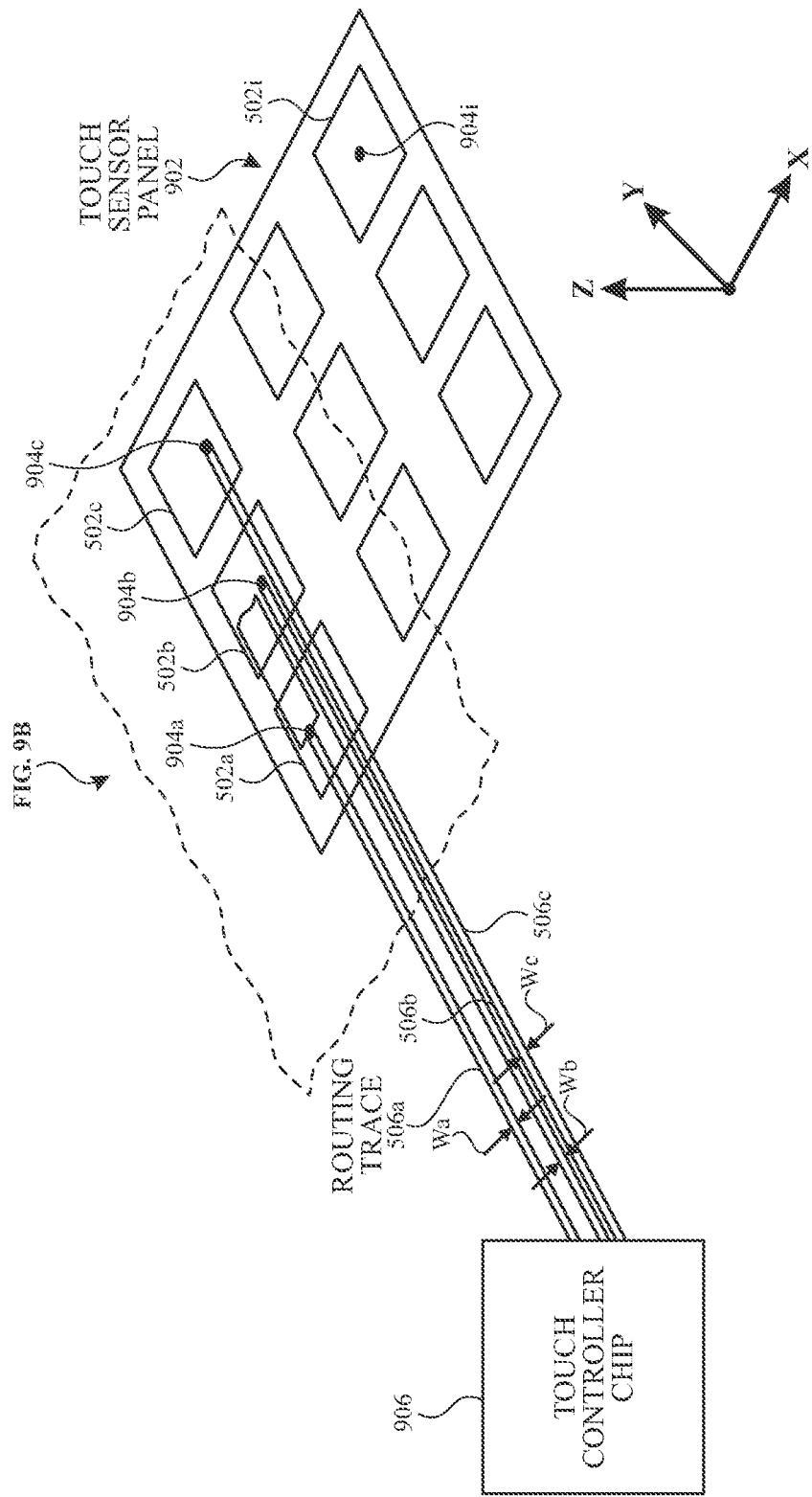
FIG. 9A illustrates a hybrid perspective view schematic of an example touch sensor panel system including a plurality of routing traces routing a plurality of touch electrodes to a touch controller chip according to examples of the disclosure.

FIG. 9A illustrates a hybrid perspective view schematic of an example touch sensor panel system including a plurality of routing traces routing a plurality of touch electrodes to a touch controller chip according to examples of the disclosure (though not all routing traces and electrodes are shown in FIG. 9A for purposes of simplifying the figure and description). As noted above, in some examples, a touch sensor panel can include touch electrodes (e.g., corresponding to touch electrode 502 or touch node electrode 408 of touch screen/panel 402). In the example shown in FIG. 9A, a plurality of touch electrodes 502*a*-502*i* having a rectangular shape are positioned in a first layer of the touch sensor panel 902 (as illustrated in the view of FIG. 5A). In some examples, routing traces of a plurality of routing traces are positioned in a third layer of the touch sensor panel (as illustrated in the view of FIG. 5A). In some examples, the routing traces are configured to connect to the respective touch electrodes 502*a*-502*i* at their respective connection points and route the touch electrodes to the touch controller chip 906 or touch sensing circuitry (e.g., touch controller 206). It is understood that although FIG. 9A illustrates routing traces 506a-506c configured to connect the respective touch electrodes 502a-502c, that additional routing traces (not shown) can be configured to connect the remaining respective touch electrodes 502d-502i. The connection can be achieved using a flex circuit as described with reference to FIGS. 8A-8B. In some examples, the widths and lengths of the routing traces can vary and be tuned to achieve a thermal drift within specification for the device (e.g., less that a threshold thermal drift).

Figure 9B:
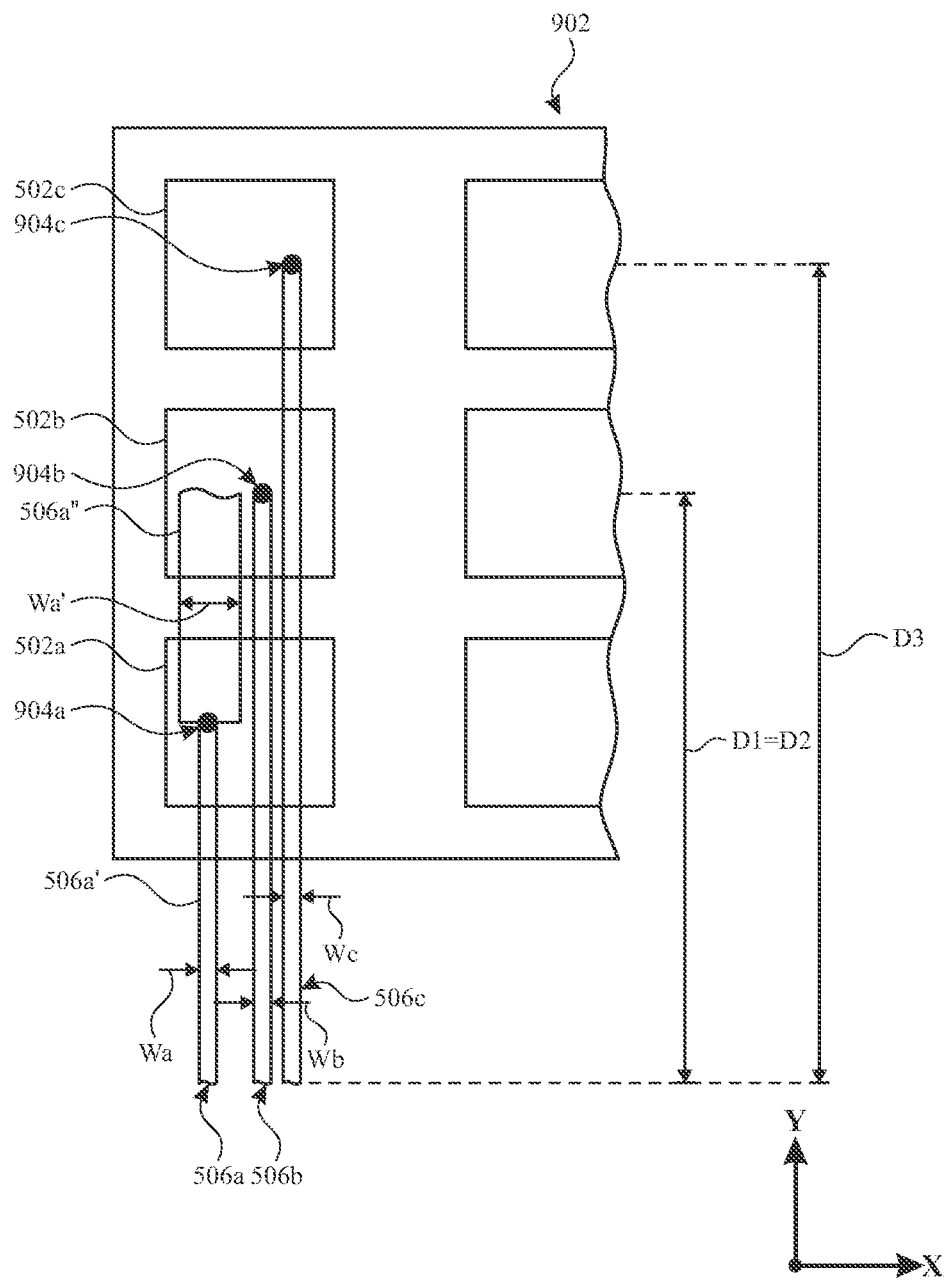
FIG. 9B illustrates an enlarged partial view of a section of the touch sensor panel system shown in FIG. 9A according to examples of the disclosure.

FIG. 9B illustrates an enlarged partial view of a section of the touch sensor panel system shown in FIG. 9A according to examples of the disclosure. As shown, the plurality of routing traces 506a-506c are connected to the respective touch electrodes 502a-502c at their corresponding connections points 904a-904c (e.g., using vias between the first layer and the third layer). In some examples, each of the routing traces may generally have a width that is constant until the connection point, but the length may generally vary (or can be constant) depending on the distance to the corresponding touch electrode. For example, routing traces 506a-506c generally have widths (e.g., Wa, Wb, Wc) that are constant until their respective connection points and lengths (e.g., D1, D2, D3) that vary and can be different from each another (or that can be the same). In some examples, within the touch sensor panel, most of the routing traces can have a uniform width, but the width may be increased for one or more routing traces to one or more touch electrodes susceptible to drift. In particular, routing trace 506a to touch electrode 502a has a trace expansion portion with a width that is larger than the respective widths (e.g., Wa' is greater than Wa, Wb, Wc) of routing trace 506b and routing trace 506c. In some examples, the routing traces can generally have a width that is less than a threshold for trace routing portions, and some routing traces can include a trace expansion portion with a width exceeding the threshold at or within a threshold distance of the connection point. As noted above, the width and the surface area of the routing traces (e.g., third electrode 704c as illustrated in view of FIGS. 7A-7B) can be tuned at specific regions (e.g., trace expansion portions) within the touch sensor panel so that its surface area is greater which in turn can cause the negative temperature coefficient material to have a greater influence on the reduction of thermal drift on the touch electrode. In some examples, within the touch sensor panel, most of the routing traces can have a length that terminates at or within the area of the corresponding touch node electrodes, but the length may be increased for one or more routing traces to one or more touch electrodes susceptible to drift such that the corresponding routing trace traversing the touch node electrode and at least partially enters the area of a downstream touch node electrode to which the corresponding routing trace does not correspond. For example, as illustrated, routing trace 506a has a length D1 that is greater than the length necessary for routing to connection point 904a to corresponding touch electrode 502a. In some examples, D1 and D2 can be the same by virtue of the expansion of routing trace 506a beyond the boundary of touch electrode 502a and into the boundary of touch electrode 502b.

As described herein, in some examples, the plurality of routing traces may have a trace routing portion and some may include a trace expansion portion. For example, a routing trace 506 includes routing portion 506a' that routes from the touch controller chip 906 to connection point 904a. Routing trace 506a also includes a trace expansion portion 506a" that is the portion of the expanded surface area beyond connection point 904a. This trace expansion portion can represent surplus routing to provide for negative drift for the system (e.g., the additional surface area of the trace expansion portion amplifying the effect that the negative temperature coefficient material). In some examples, the surplus routing in the trace expansion portion can have a different width than the routing portion. In particular, as shown, the trace expansion portion 506a" has a width Wa' greater than the width Wa of the routing portion 506a'.

Additionally, in some examples, the trace expansion portion can extend beyond a second boundary of the corresponding touch electrode and beyond a first boundary of a downstream touch electrode. For example, as illustrated, trace expansion portion 506a" expands beyond the boundary associated with touch electrode 502a (different from the boundary crossed by routing trace 506a) and beyond the boundary associated with touch electrode 502b. The dimensions of the trace expansion portion 506a" can be tuned to reduce thermal drift and/or meet a condition for substantially zero thermal drift.

As described herein, in some examples, expanding the surface area of the trace expansion portion can be achieved by expanding beyond the boundaries of their respective touch electrodes and into the boundary or region of other adjacent touch electrodes. For example, referring to routing trace 506a in FIG. 9B, routing trace 506a is connected to touch electrode 502a at its corresponding connection point 904a (e.g., using a via through a second layer between the first and third layers). Instead of terminating the routing trace 506a at connection point 904a, routing trace 506a extends beyond the area of touch electrode 502a (e.g., crossing a second boundary) and into the area of touch electrode 502b (e.g., crossing the boundary of another downstream touch electrode). By expanding the surface area of routing trace 506a using a trace expansion portion 506a" extending it into the boundary of the touch electrode 502b, the increase in surface area can magnify the effect that the negative temperature coefficient material has on the touch electrode 502a, which in turn improves the reduction of thermal drift at the touch electrode 502a. In other examples, the routing traces can connect to their corresponding touch electrodes using their corresponding connection points and stay within the boundaries of their corresponding touch electrodes (with or without a trace expansion portion). For example, referring to routing trace 506b in FIG. 9B, routing trace 506b is coupled to touch electrode 502b at its corresponding connection point 904b, and does not expand beyond its area (e.g., after crossing a first boundary to enter the area of the touch electrode) and extend into downstream adjacent touch electrodes (e.g., touch electrode 502c).

In some examples, the dimensions of the routing traces in the flex circuit can be uniform (e.g., same width and same length for each of the routing traces). In some examples, the dimensions of the routing traces in the flex circuit can also be tuned for some routing traces (e.g., to have an increase width and/or length relative to the default routing traces).

FIG. 10 illustrates another example touch sensor panel system including a circular touch sensor panel 1000 and a plurality of routing traces 1006a-1006n routing a plurality of touch electrodes 1002a-1002n to a touch controller chip 906 according to examples of the disclosure (though not all traces and electrodes are shown in FIG. 10 for purposes of simplifying the figure). The routing traces between the boundaries of the touch sensor panel and the touch controller chip can be implemented in a flex circuit (e.g., corresponding to FIGS. 8A-8B). The touch sensor panel 1000 includes a plurality of touch electrodes 1006a-1006n with corresponding connection points 1004a-1004n (e.g., vias). In some examples, each of the touch electrodes 1002a-1002n may have the same shape or have different geometries and sizes. Each of the plurality of routing traces 1006a-1006n is configured to route one of the plurality of touch electrodes 1006a-1006n to the touch controller chip 906. For example, as illustrated, routing trace 1006a is coupled to connection point 1004a of touch electrode 1002a and is routed to the touch controller chip 906.

In some examples, each of the plurality of routing traces 1006a-1006n may be made from a copper material or any other material or combination of materials that can provide efficient electrical conduction. In some examples, each of the plurality of routing traces 1006a-1006n may have the same shape or have different geometries and configurations. For example, as shown in FIG. 10, routing trace 1006a and 1006n both include trace expansion portions (trace expansion portions 1006a' and 1006n' shown with crosshatching) that provide a larger surface area compared to the other routing traces. By having an expanded surface area, thermal drift on the touch sensor panel 1000 that appears at some touch electrodes can be minimized, which can lead to a reduction in false touches being detected. In particular, routing trace 1006a including a trace routing portion (e.g., with width comparable to other routing traces) that is coupled to connection point 1004a of touch electrode 1002a. Routing trace 1006a also includes a trace expansion portion 1006a' with a surface area that is expanded beyond connection point 1004a (e.g., to form a conductive region wider than the remainder of the routing trace before connection point 1004a). The trace expansion portion 1006a' (conductive region) can have a surface area greater than the surface area of the routing trace 1006a before connection point 1004a, and optionally greater than the surface area of the other routing traces (e.g., 1006b, 1006c, etc.). As illustrated, routing trace 1006a includes a trace expansion portion 1006a' that expands beyond the termination at connection point 1004a and into the boundary associated with an adjacent touch electrode (e.g., downstream touch electrode 1002b). In this way, the surface area of the routing trace can be expanded (particularly where the area of touch electrode 1002 may be partially occupied by other routing traces to downstream touch electrodes), and the larger surface area of the routing trace 1006a can enhance the contribution of the negative temperature coefficient materials in the stack-up, which in turn can result in a decrease in thermal drift and decrease in false touches on the touch sensor panel 1000.

In some examples, the routing traces can be expanded into the boundaries of more than one adjacent touch electrodes. As further illustrated in FIG. 10, routing trace 1006n is coupled to connection point 1004n of touch electrode 1002n and includes a trace expansion portion expanding the surface area beyond connection point 1004n and the second boundary of touch electrode 1002n. In particular, routing trace 1006n includes a trace expansion portion 1006n' that expands beyond the connection point back into the boundary associated with touch electrode 1002c (after the trace routing portion of routing trace 1006n already crossed this boundary) and into the boundary associate with touch electrode 1002d, which are adjacent to touch electrode 1002n. Accordingly, the trace expansion region of routing trace 1006n is located within the regions of three touch electrodes (e.g., 1002c, 1002d, 1002n). As noted above, the size and geometry of each of the routing traces may vary and can be tuned to reduce thermal drift and/or meet a condition for substantially zero thermal drift (e.g., less than a threshold drift).

In some examples, select boundaries and regions of the touch electrodes can be identified as exceeding a thermal drift threshold. In some examples, when a region is identified as exceeding its corresponding thermal drift threshold, a thickness of the negative temperature coefficient material can be tuned (e.g., increased or decreased) at the regions where thermal drift is identified as exceeding the thermal drift threshold. In some examples, when the thickness of the negative temperature coefficient material is increased or decreased to achieve a desired thermal drift condition, the overcall thickness of the touch sensor panel can be tuned so that the overall thickness is maintained, increased, or reduced. For example, the touch sensor panel 1000 may include one or more passivation layers. When the thickness of the negative temperature coefficient material is increased, one or more passivation layers or adhesive layers can be reduced (to accommodate the increase in thickness of the negative temperature coefficient material) so that the overall thickness of the touch sensor panel is maintained. In some examples, when the thickness of the negative temperature coefficient material is increased, the thickness of the positive temperature coefficient material can be reduced (to accommodate the increase in thickness of the negative temperature coefficient material) so that the overall thickness of the touch sensor panel is maintained. Accordingly, when tuning the thickness of the negative temperature coefficient material and/or the thickness of the positive temperature coefficient material, the overall thickness of the touch sensor panel can be maintained so the thickness throughout the various regions of the touch sensor panel is uniform. In some examples, a surface area of the plurality of routing traces can be tuned (e.g., increased) at the regions (and/or for routing traces corresponding to touch electrodes) where thermal drift is identified as exceeding the thermal drift threshold. In this way, the touch sensor panel may have areas where the thickness of the negative temperature coefficient material and/or surface area of the routing traces are larger at selected regions. For example, referring to FIG. 10, the regions associated with touch electrodes 1002a and 1002n are identified as areas where the thermal drift exceeds the thermal drift threshold. Accordingly, routing trace 1006a and routing trace 1006n have expanded surface areas and/or the thickness of the negative temperature coefficient material in those areas can be increased so that it can help reduce the thermal drift in the respective regions.

Figure 11:
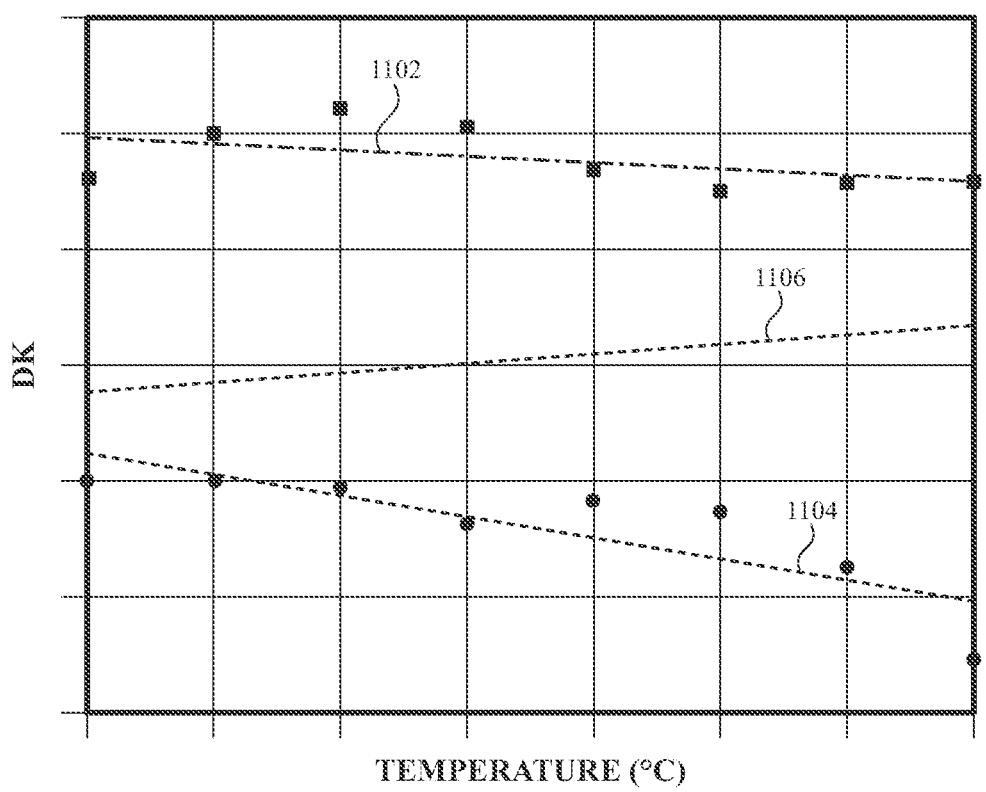
FIG. 11 illustrates a plot of temperature versus dielectric constant for a negative temperature coefficient material and positive temperature coefficient material according to examples of the disclosure.

FIG. 11 illustrates a plot of temperature versus dielectric constant for a negative temperature coefficient material and positive temperature coefficient material according to examples of the disclosure. Generally, an increase in temperature affects the dielectric constant of dielectric materials. For example, the dielectric constant of negative temperature coefficient materials decreases with increasing temperature. Positive temperature coefficient materials can experience an increase in dielectric constant when their temperature is raised. FIG. 11 illustrates how negative temperature coefficient material and positive temperature coefficient material respond to an increase in temperature. As shown, the dielectric constant of negative temperature coefficient materials (e.g., polyamide 1102, adhesive 1104) decreases as its temperature is raised. As further illustrated, the resistance of a positive temperature coefficient material (e.g., 1106) increases as its temperature is raised.

Therefore, according to the above, some examples of the disclosure are directed to a touch sensor panel. The touch sensor panel can comprise: a plurality of touch electrodes in a first layer, the plurality of touch electrodes including a first touch electrode and a second touch electrode; one or more dielectric materials in a second layer, the one or more dielectric materials including a negative temperature coefficient material; and a plurality of routing traces in a third layer separated from the first layer by the second layer, the plurality of routing traces routing the plurality of touch electrodes to a touch controller chip, and the plurality of routing traces including a first routing trace routing the first touch electrode to the touch controller chip and a second routing trace routing the second touch electrodes to the touch controller chip. Additionally or alternatively to one or more of the examples disclosed above, in some examples, a width of the first routing trace is greater than a width of the second routing trace. Additionally or alternatively to one or more of the examples disclosed above, in some examples, the first routing trace includes a routing portion and a trace expansion portion. The routing portion extends beyond a first boundary of the first touch electrode to a connection point. The trace expansion portion extends beyond the connection point, and the surface area of the trace expansion portion is greater than the surface area of the routing portion. Additionally or alternatively to one or more of the examples disclosed above, in some examples, the trace expansion portion extends beyond a second boundary of the first touch electrode, different than the first boundary of the first touch electrode and into a boundary of the second touch electrode that is adjacent to the first touch electrode. Additionally or alternatively to one or more of the examples disclosed above, in some examples, a width of the trace expansion portion is greater than a width of the routing portion. Additionally or alternatively to one or more of the examples disclosed above, in some examples, the trace expansion portion extends into a boundary of a third touch electrode that is adjacent to the first touch electrode or the second touch electrode. Additionally or alternatively to one or more of the examples disclosed above, in some examples, the one or more dielectric materials in the second layer includes a positive temperature coefficient material, and a thickness of the negative temperature coefficient material is greater than a thickness of the positive temperature coefficient material. Additionally or alternatively to one or more of the examples disclosed above, in some examples, the positive temperature coefficient material and the negative temperature coefficient material are separated by a corresponding routing trace of the plurality of routing traces. Additionally or alternatively to one or more of the examples disclosed above, in some examples, the one or more dielectric materials in the second layer include a positive temperature coefficient material, and a thickness of the negative temperature coefficient material is less than or equal to a thickness of the positive temperature coefficient material. Additionally or alternatively to one or more of the examples disclosed above, in some examples, the negative temperature coefficient material includes an adhesive or a polymer. Additionally or alternatively to one or more of the examples disclosed above, in some examples, a thickness of the negative temperature coefficient material is increased at select regions of the plurality of touch electrodes that are identified as exceeding a thermal drift threshold to cause a reduction in said thermal drift at said select regions. Additionally or alternatively to one or more of the examples disclosed above, in some examples, a surface area of the plurality of routing traces is increased at select regions of the plurality of touch electrodes that are identified as exceeding a thermal drift threshold to cause a reduction in thermal drift at said select regions. Additionally or alternatively to one or more of the examples disclosed above, in some examples, a thickness of the negative temperature coefficient material and a surface area of one or more of the plurality of routing traces are tuned such that a thermal drift for the touch sensor panel is less than a threshold.

Some examples of the disclosure are directed to a touch sensor panel. The touch sensor panel can comprise: a plurality of touch electrodes in a first layer, the plurality of touch electrodes including a first touch electrode and a second touch electrode; one or more dielectric materials in a second layer, the one or more dielectric materials including a negative temperature coefficient material; and a plurality of routing traces in a third layer separated from the first layer by the second layer, the plurality of routing traces routing the plurality of touch electrodes to a touch controller chip, and the plurality of routing traces including a first routing trace routing the first touch electrode to the touch controller chip and a second routing trace routing the second touch electrodes to the touch controller chip. The first routing trace includes a routing portion and a trace expansion portion, the routing portion extends beyond a first boundary of the first touch electrode to a connection point. The trace expansion portion extends beyond the connection point beyond a second boundary of the first touch electrode, different than the first boundary of the first touch electrode and into a boundary of the second touch electrode that is adjacent to the first touch electrode. Additionally or alternatively to one or more of the examples disclosed above, in some examples, a width of the first routing trace is greater than a width of the second routing trace. Additionally or alternatively to one or more of the examples disclosed above, in some examples, a surface area of the trace expansion portion is greater than a surface area of the routing portion. Additionally or alternatively to one or more of the examples disclosed above, in some examples, the one or more dielectric materials in the second layer includes a positive temperature coefficient material, and a thickness of the negative temperature coefficient material is greater than a thickness of the positive temperature coefficient material. Additionally or alternatively to one or more of the examples disclosed above, in some examples, a thickness of the negative temperature coefficient material is increased at select regions of the plurality of touch electrodes that are identified as exceeding a thermal drift threshold to cause a reduction in said thermal drift at said select regions. Additionally or alternatively to one or more of the examples disclosed above, in some examples, a thickness of the negative temperature coefficient material and a surface area of one or more of the plurality of routing traces are tuned such that a thermal drift for the touch sensor panel is less than a threshold. Additionally or alternatively to one or more of the examples disclosed above, in some examples, the negative temperature coefficient material includes an adhesive or a polymer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A touch sensor panel, comprising:
a plurality of touch electrodes in a first layer, the plurality of touch electrodes including a first touch electrode and a second touch electrode;
one or more dielectric materials in a second layer, the one or more dielectric materials including a negative temperature coefficient material; and a plurality of routing traces in a third layer separated from the first layer by the second layer, the plurality of routing traces routing the plurality of touch electrodes to a touch controller chip, and the plurality of routing traces including a first routing trace routing the first touch electrode to the touch controller chip and a second routing trace routing the second touch electrodes to the touch controller chip.

2. The touch sensor panel of claim 1, wherein a width of the first routing trace is greater than a width of the second routing trace.

3. The touch sensor panel of claim 1, wherein the first routing trace includes a routing portion and a trace expansion portion, wherein the routing portion extends beyond a first boundary of the first touch electrode to a connection point, and wherein the trace expansion portion extends beyond the connection point, and wherein a surface area of the trace expansion portion is greater than a surface area of the routing portion.

4. The touch sensor panel of claim 3, wherein the trace expansion portion extends beyond a second boundary of the first touch electrode, different than the first boundary of the first touch electrode and into a boundary of the second touch electrode that is adjacent to the first touch electrode.

5. The touch sensor panel of claim 3, wherein a width of the trace expansion portion is greater than a width of the routing portion.

6. The touch sensor panel of claim 3, wherein the trace expansion portion extends into a boundary of a third touch electrode that is adjacent to the first touch electrode or the second touch electrode.

7. The touch sensor panel of claim 1, wherein the one or more dielectric materials in the second layer includes a positive temperature coefficient material, and a thickness of the negative temperature coefficient material is greater than a thickness of the positive temperature coefficient material.

8. The touch sensor panel of claim 7, wherein the positive temperature coefficient material and the negative temperature coefficient material are separated by a corresponding routing trace of the plurality of routing traces.

9. The touch sensor panel of claim 1, wherein the one or more dielectric materials in the second layer include a positive temperature coefficient material, and a thickness of the negative temperature coefficient material is less than or equal to a thickness of the positive temperature coefficient material.

10. The touch sensor panel of claim 1, wherein the negative temperature coefficient material includes an adhesive or a polymer.

11. The touch sensor panel of claim 1, wherein a thickness of the negative temperature coefficient material is increased at select regions of the plurality of touch electrodes that are identified as exceeding a thermal drift threshold to cause a reduction in said thermal drift at said select regions.

12. The touch sensor panel of claim 1, wherein a surface area of the plurality of routing traces is increased at select regions of the plurality of touch electrodes that are identified as exceeding a thermal drift threshold to cause a reduction in thermal drift at said select regions.

13. The touch sensor panel of claim 1, wherein a thickness of the negative temperature coefficient material and a surface area of one or more of the plurality of routing traces are tuned such that a thermal drift for the touch sensor panel is less than a threshold.

14. A touch sensor panel, comprising:
a plurality of touch electrodes in a first layer, the plurality of touch electrodes including a first touch electrode and a second touch electrode;
one or more dielectric materials in a second layer, the one or more dielectric materials including a negative temperature coefficient material; and
a plurality of routing traces in a third layer separated from the first layer by the second layer, the plurality of routing traces routing the plurality of touch electrodes to a touch controller chip, and the plurality of routing traces including a first routing trace routing the first touch electrode to the touch controller chip and a second routing trace routing the second touch electrodes to the touch controller chip;
wherein the first routing trace includes a routing portion and a trace expansion portion, the routing portion extends beyond a first boundary of the first touch electrode to a connection point, and wherein the trace expansion portion extends beyond the connection point beyond a second boundary of the first touch electrode, different than the first boundary of the first touch electrode and into a boundary of the second touch electrode that is adjacent to the first touch electrode.

15. The touch sensor panel of claim 14, wherein a width of the first routing trace is greater than a width of the second routing trace.

16. The touch sensor panel of claim 14, wherein a surface area of the trace expansion portion is greater than a surface area of the routing portion.

17. The touch sensor panel of claim 14, wherein the one or more dielectric materials in the second layer includes a positive temperature coefficient material, and a thickness of the negative temperature coefficient material is greater than a thickness of the positive temperature coefficient material.

18. The touch sensor panel of claim 14, wherein a thickness of the negative temperature coefficient material is increased at select regions of the plurality of touch electrodes that are identified as exceeding a thermal drift threshold to cause a reduction in said thermal drift at said select regions.

19. The touch sensor panel of claim 14, wherein a thickness of the negative temperature coefficient material and a surface area of one or more of the plurality of routing traces are tuned such that a thermal drift for the touch sensor panel is less than a threshold.

20. The touch sensor panel of claim 14, wherein the negative temperature coefficient material includes an adhesive or a polymer.

* * * * *